US009369615B1

(12) United States Patent
Rice (10) Patent No.: US 9,369,615 B1
(45) Date of Patent: Jun. 14, 2016

(54) CAMERA FOR HANDHELD DEVICE (76) Inventor: Drake R. Rice, Castro Valley, CA (US)

(*) Notice: Subject to any disclaimer, the term of this patent is extended or adjusted under 35 U.S.C. 154(b) by 0 days.

(21) Appl. No.: 13/136,521

(22) Filed: Aug. 2, 2011

Related U.S. Application Data (60) Provisional application No. 61/400,835, filed on Aug. 3, 2010.

(51) Int. Cl.
H04N 5/225 (2006.01)
G03B 17/48 (2006.01)

(52) U.S. Cl.
CPC .............. *H04N 5/2252* (2013.01); *G03B 17/48* (2013.01)

(58) Field of Classification Search
CPC ...... H04N 5/2252; G03B 17/48; G03B 17/56; G03B 17/566; G03B 2217/00; G03B 2217/002; G03B 29/00
USPC ........................... 348/207.1, 207.11, 373, 376
See application file for complete search history.

(56) References Cited

U.S. PATENT DOCUMENTS

| 6,587,151 | B1* | 7/2003 | Cipolla et al. ................ 348/373 |
| 6,978,939 | B2* | 12/2005 | Russell .............. H04N 1/00347 235/375 |
| 7,239,349 | B2* | 7/2007 | Saito et al. ................. 348/231.7 |
| 8,475,059 | B2* | 7/2013 | Khamsepoor et al. ........ 396/428 |
| 2005/0007445 | A1* | 1/2005 | Foote et al. ................ 348/14.08 |
| 2006/0044394 | A1* | 3/2006 | Read .......................... 348/207.1 |
| 2007/0071432 | A1* | 3/2007 | Senba .......................... 396/121 |
| 2008/0309768 | A1* | 12/2008 | Chung ..................... 348/207.11 |
| 2009/0093274 | A1* | 4/2009 | Yamamoto .................... 455/566 |
| 2009/0273809 | A1* | 11/2009 | Grosso et al. ................ 358/1.15 |
| 2010/0039552 | A1* | 2/2010 | Kao ............................. 348/373 |
| 2010/0302436 | A1* | 12/2010 | Gasnier et al. ............... 348/373 |
| 2011/0009163 | A1* | 1/2011 | Fletcher et al. ............ 455/556.1 |

* cited by examiner

*Primary Examiner* — Kelly L Jerabek
(74) *Attorney, Agent, or Firm* — West & Associates, A PC; Stuar J. West; Theodore Marsh (57) ABSTRACT A frame that has a camera is slid onto a handheld computer. The frame also has an interface for communicatively connecting the camera to the handheld computer. The frame may be used for sending images taken from the camera to the handheld computer, which optionally may be further processed. Optionally, the frame may also have a microphone for recording sounds.

11 Claims, 11 Drawing Sheets

CAMERA FOR HANDHELD DEVICE

CROSS-REFERENCE TO RELATED APPLICATIONS

This application claims priority benefit of U.S. Provisional Patent Application No. 61/400,835, entitled "Digital Frame Camera," filed Aug. 3, 2010, by Drake Rice, which is incorporated herein by reference.

FIELD

The invention relates to digital photography.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Handheld computers are old and well know, and cameras are old and well know.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF PREFERRED EMBODIMENTS

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Figure 1:
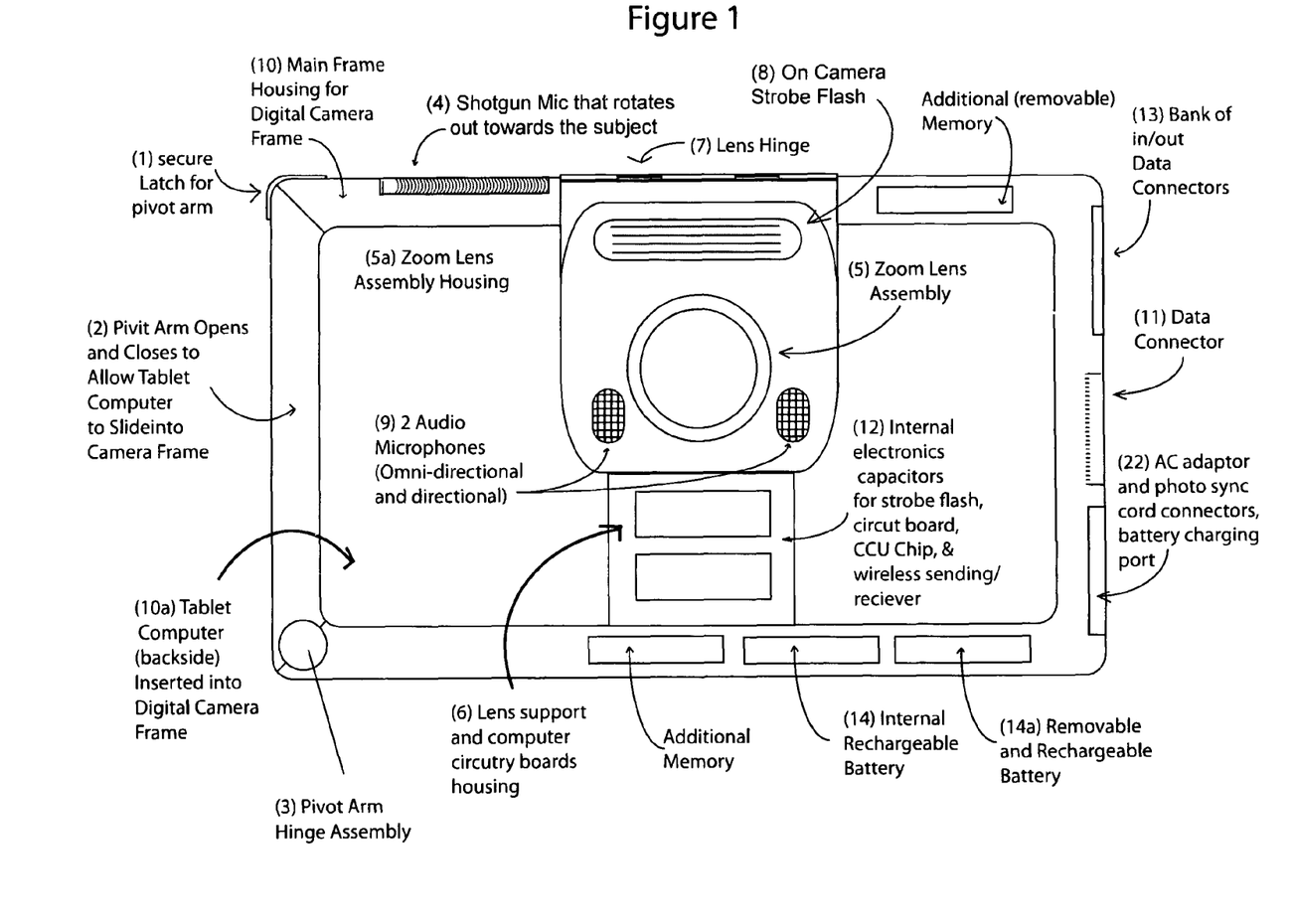
FIG. 1 shows a front view of an embodiment of a cover for a tablet computer having digital camera system (a digital frame camera).

FIG. 1 shows a front view of an embodiment of a digital camera system including at least a frame type structure (10) that serves as a cover for a handheld computing device or network appliance, such as tablet computer, other handheld computer, mobile phone, and/or smart phone, which may be referred to as a hand held device. The camera built into the frame may be in addition to, or instead of, a camera onboard the handheld computer. As mobile phones have processors and computing capabilities, in this specification the term handheld computer is generic to mobile phone, unless otherwise indicated. The handheld device is inserted into the frame (10) and a pivot arm (2) opens and closes to hold the handheld device in place, then a latch (1) locks the arm into place. The pivot arm hinge assembly (3) enables the pivot arm to swing and pivot. The pivot arm hinge may also secure the handheld device in place. The hinge assembly may be made of a variety of materials, such as metal or plastic, and may be constructed with at least one or more turning and rotating mechanisms so that the pivot arm may move smoothly and securely. The digital frame camera may have a live open form factor. In an embodiment, instead of leaving open sections (on either side of the lens housing), the frame could be closed off with plastic covering. In an embodiment, the handheld computer may be held in place by a clam shell enclosure instead of a swivel arm.

The housing frame (10) and the pivot arm (2) may be comprise of any material, such as any hard plastics, any metal, or a combination of any metal and plastic that maximizes the camera's strength, durability, functionality, and performance. Any plastic or composite material may be used in the construction of the frame housing and swing arm. The frame housing (10) and pivot arm (2) may also be made of metal such as stainless steel, aluminum, magnesium, brass, or any other metal (or any mixture or alloy of those metals) that may best serve the structural integrity of the digital frame camera. In an embodiment, the construction of the digital camera frame may be a combination of metal and plastic to ensure the unit may have a high degree of functionality, durability, and performance with the best case being that the combination of these materials may yield the above mentioned properties while being light weight.

The front view of FIG. 1 also shows a front facing shot gun directional microphone (4), which is designed to work in at least two configurations. One form of use is when the microphone is in the "normal" state, in which microphone (4) is flush flat against the frame. The microphone may also be used in the extended position.

FIG. 1 also shows at least set of one omni-directional microphones (9) mounted on the zoom lens assembly housing (5a). The housing may optionally also include at least one flash (8). Below the zoom lens assembly housing may be a support for the lens and computer electronics housing (6). A rechargeable battery (14) may be embedded in the housing frame (10), which may provide power for the digital frame camera, on board flash, and the handheld device. The embedded electronics may also include a Chip Control Unit (CCU) that drives (and regulates) the functions of the other electrons, such as memory, capacitors, rechargeable batteries.

Flash (8) may be a strobe light, an on-camera-strobe flash, or other type of flash, which may be triggered automatically by taking a picture. In an embodiment, the digital frame camera has built in electronics to accommodate the energy demand. The built in electronics may include at least one capacitor that may fire and recharge, so that the flash activity will not place undue stress on the electronics of the phone or tablet computer.

FIG. 1 also shows that the housing frame (10) may also contain one or more electronic capacitors (12) that hold a charge for powering the flash. The frame housing may also contain other electronic components that enable and enhance the functionality of the digital frame camera, including, but not limited to, memory functions, wireless connection functions, lens functions, sound functions, button and dial functions, power supply functions, and/or functions associated with the plugs and connectors.

Figure 2:
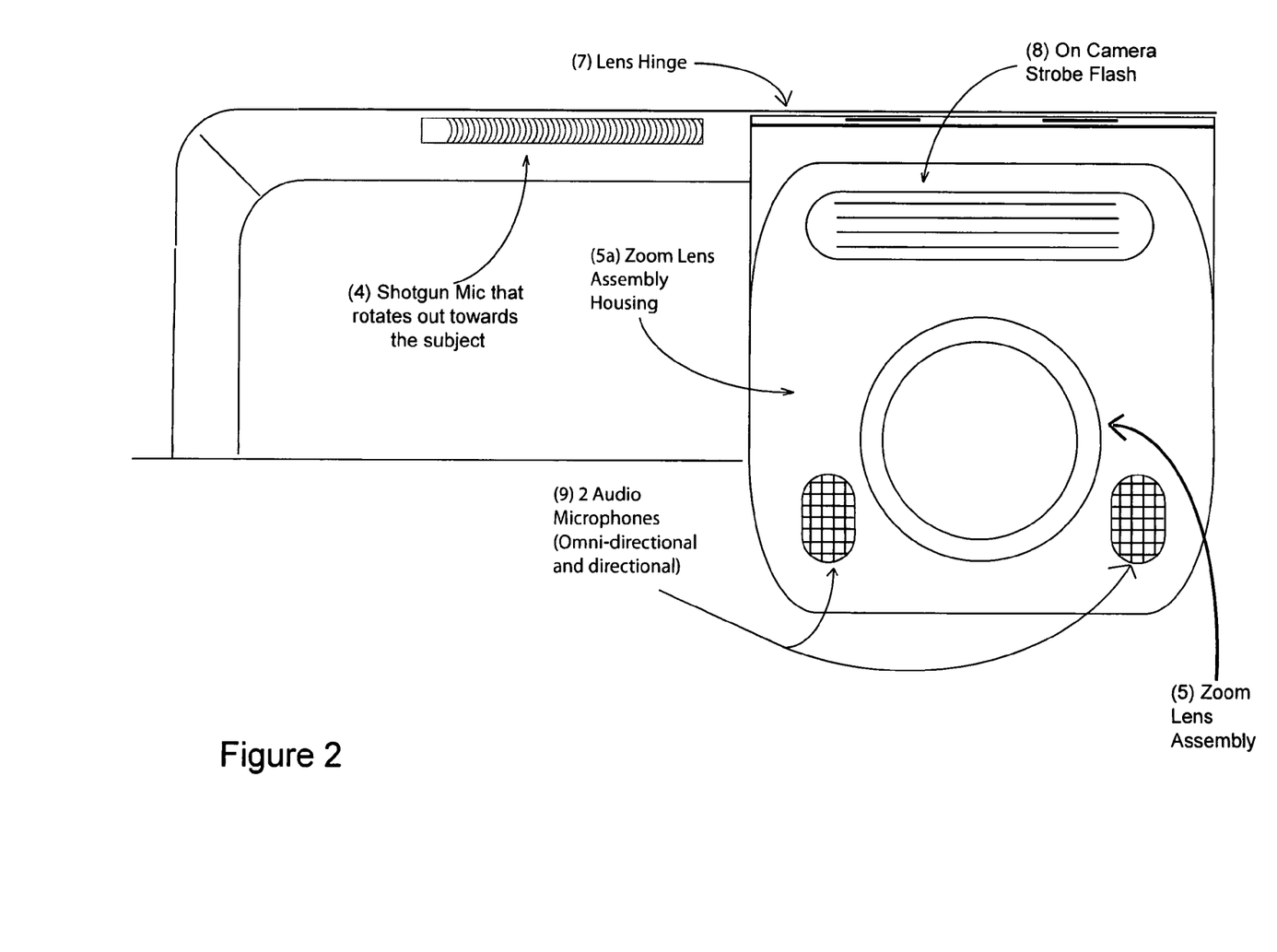
FIG. 2 shows an enlarged front view of an embodiment of the quarter section of the digital frame camera.

FIG. 2 is an enlarged front view of the quarter section of the digital frame camera, which shows a larger image of the dual function shotgun microphone (4). The shotgun microphone, while in the extended position, can be rotated to various angles depending on the elevation or position of the subject being photographed. The camera system may have a microphone that may perform in the retracted position shown in FIG. 2, or in the extended position shown in FIG. 3.

FIG. 2 also shows an embodiment of the zoom lens assembly housing (5a), which houses the zoom lens (5), the flash (8), and the omni-directional microphones (9). The zoom lens assembly housing (5a) also houses at least one image sensor device that may utilize either CCD, CMOS sensors technology, or any other image sensor technology that functions effectively with the handheld device system (or smart phone) technology or operating system. The lens is spaced from the image sensor by an appropriate amount to focus the image onto the image sensor.

Figure 3:
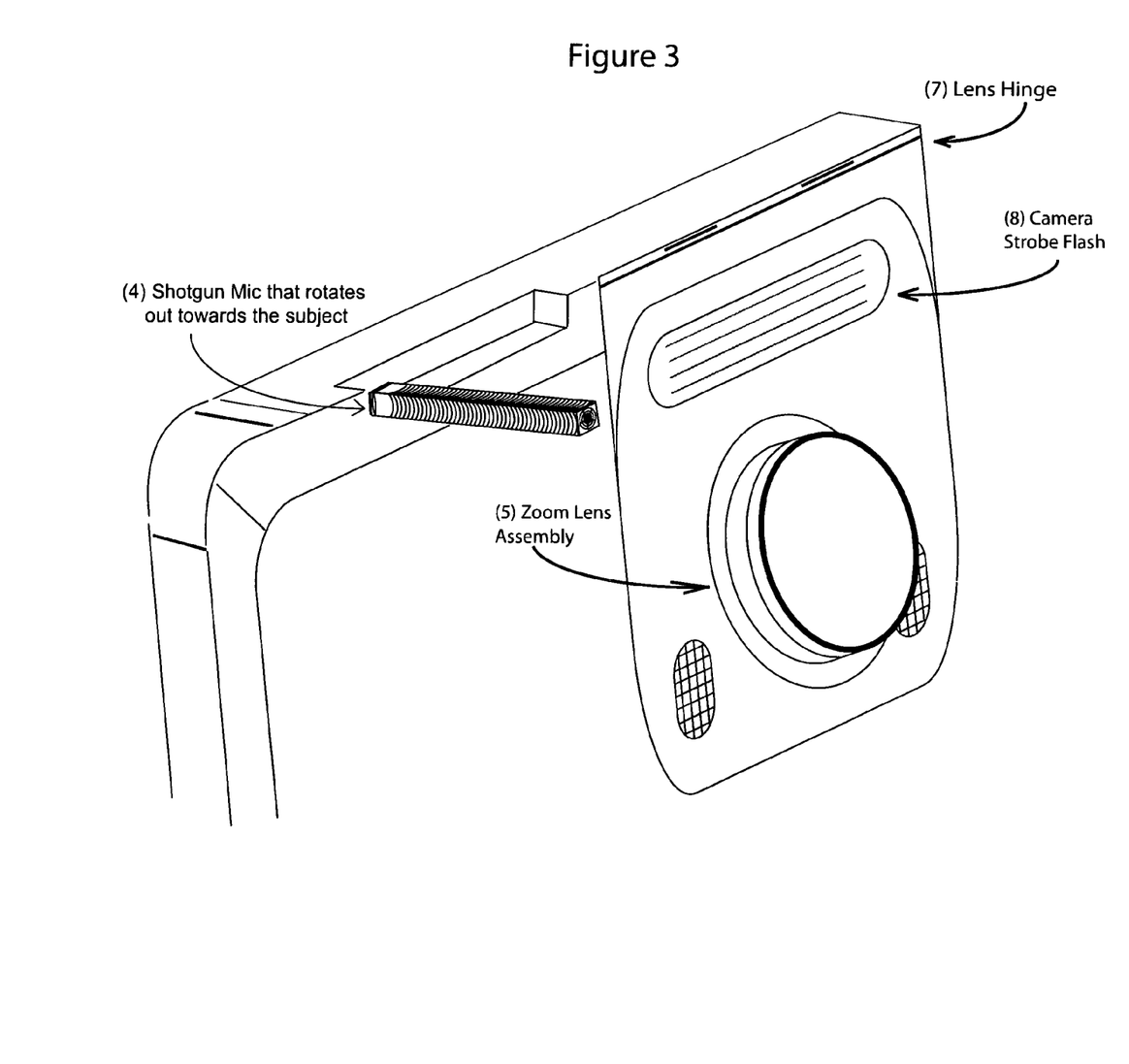
FIG. 3 shows a ¾ view of an embodiment of a dual use shotgun mic from an extended position.

FIG. 2 also shows the zoom lens assembly (5), which may be detachable. Optionally, there may be a variety of lenses of different types and/or focal lengths, which may have a connector for attaching to the lens mount (which is on the cover that makes up the camera frame) in place of the zoom lens, so that the user may choose the lens according to needs of the situation. In another embodiment, the zoom lens is permanently attached, instead of being detachable FIG. 3 shows a ¾ view and illustrates the dual use shot gun mic (4) in an extended position. FIG. 3 is a close up view of a front section of the digital frame camera. In an embodiment, the dual-use shot gun microphone is extended to capture sound from a subject(s) at a distance, which may enhance sound captured in conjunction with onboard ambient microphones. The shot gun mic performs with the same characteristics of standard shot gun mics. The shot gun mic (4) may function in the contracted position. Optionally the camera frame may include directional microphones other than a shot gun mic in addition to or instead of the shotgun mic. Also, in FIG. 3, the zoom lens assembly (5) can be seen in the partially extended position.

Figure 4:
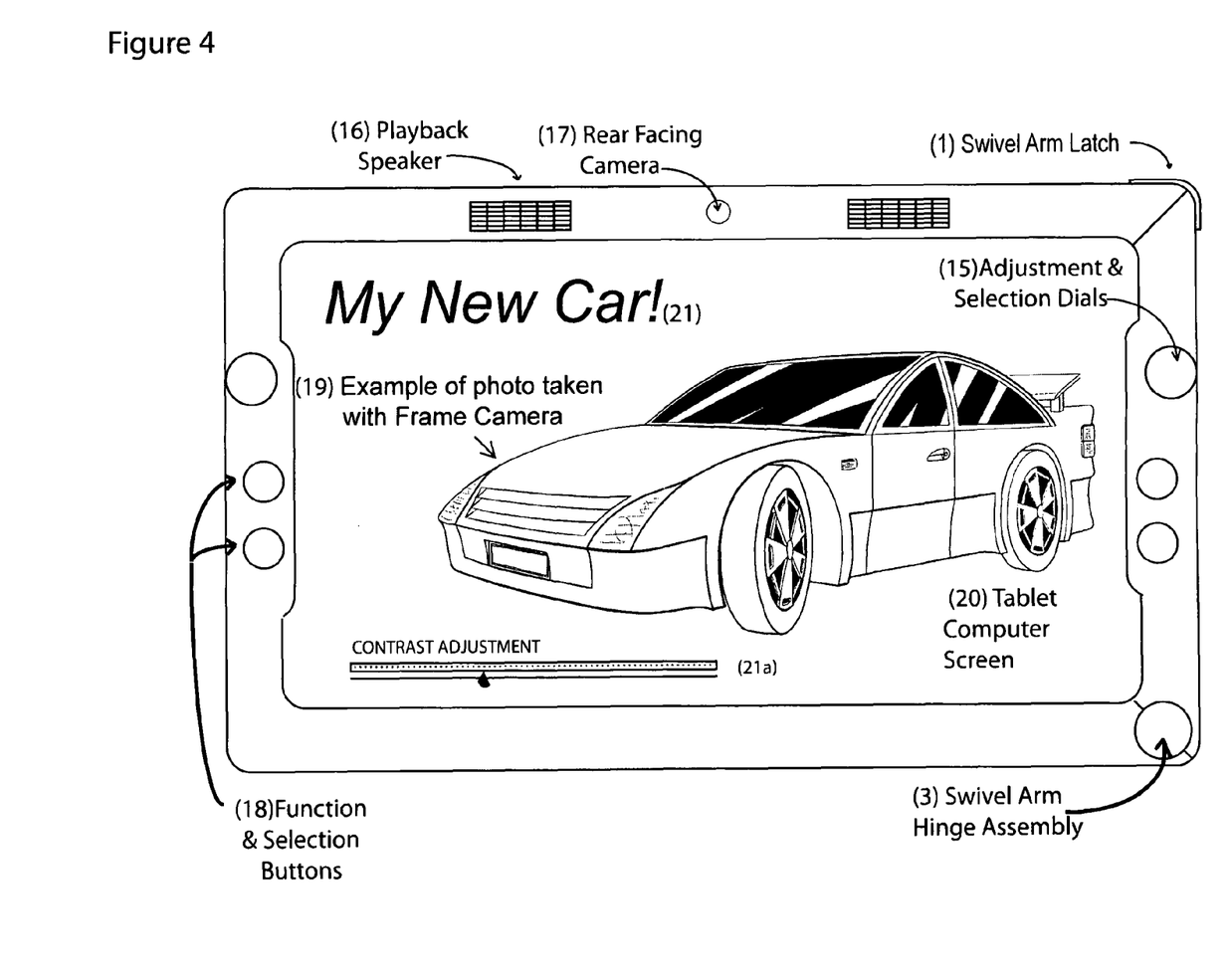
FIG. 4 is a view of an embodiment of the back of the digital frame camera.

FIG. 4 is a view of the back of the digital frame camera. From the perspective of FIG. 4, one can view additional elements and features that operate this device. One of many innovative features is that the device may have an adjustment and selection dial (15), which functions as an instrument for selecting file/software icons, selecting images and sections of the images, adjusting color, contrast, images size, and/or may include any other image and device method of selection and adjustment. Selection dial 15 may include two adjustments, which when used together may be effective in specific fine adjustments and the selections of images and graphics. The dials in 15 work in conjunction with one another to select sections of an image or place graphic elements in an exact location. In one embodiment two of the dials may work in unison similar to an "Etch-A-Sketch" (the toy) to position a cursor.

FIG. 4 also shows that the device may include at least one speaker (16) on the back of the digital frame camera, which may be used for playing back recorded sounds. There is a small rear facing camera that is located on the same side as the viewing screen. The rear facing camera was added, because when the tablet is in the Digital Camera Frame it is likely that the frame will cover the small rear facing camera. In an alternative embodiment there may be a hole where the rear facing camera is on the tablet, and different digital frame cameras having the holes in different places may be manufactured for different devices that have built-in cameras in different corresponding locations.

In an embodiment, the device may have two or more speakers (16). These speakers may be positioned on various sections of the back of the digital frame camera where the speakers are expected to contribute best to the functionality of the sound playback function. The speakers may be various sizes and shapes such as square, rectangle, round, oval, and other various shapes. Also, in FIG. 4 is the back of camera frame (17), which may cover a second side of the handheld device, and which may have the capability of taking a picture of the device user and send the still image or video with sound over the internet via handheld device web technology. The camera frame (17) may have a still image photo mode and/or video image mode, either of which may have an option of recording sounds associated with the images. The sounds and images may be stored in the handheld device's memory system, such as on a hard drive or flash memory or any other data memory system utilized by the handheld devices operating system.

FIG. 4 also depicts the function and selection buttons (18) (which may be multi use) that may be programmed for a variety of uses and functions. The digital frame camera may have at least one function and selection button (18), but may have two (or more) buttons. In an embodiment, the device may have four buttons, which may be programmed for a variety of functions and uses depending on the user's needs and intentions, such as software and file icon selection, various image adjustment features such as color, contrast, image, or video selection. Also these buttons can be used to select and adjust recorded sound (such as the sound is being recorded), and change the quality of sound, such as a features for adjusting pitch, clarity, levels, harmonics, vibration, and/or frequency. Optionally, the buttons may control a variety of software and application-driven special effects that may be added to the audio recording. The function and selection buttons (18) may also be used to drive the operation and functions of the zoom lens assembly housing (5a) (which is featured in FIG. 1).

In adjusting the zoom lens, the function and selection buttons (18) can be configured to operate the many features of the zoom lens assembly housing (5a), such as lens zoom in and out, adjust the lens aperture, adjust levels and functionality of the flash (8) units located on the Zoom lens assembly housing (5a), and all the microphones on the unit.

Additionally, FIG. 4 shows a sample image (19) that was taken by the digital frame camera, in the FIG. 4 example the image is a still photo, yet the same image may be shot in full motion video mode with sound as well. The image of FIG. 4 is shown on the screen of the handheld device (20), which may display the image in a variety of modes depending on the use of the many software and application features that are provided with the digital frame camera. In an embodiment, The digital frame camera utilizes the touch screen of the tablet computer or smart phone once these devices are slid into it. The software for controlling the lens may view the image, and may have control features for making real time photo, video, and/or sound adjustments. The software may be capable of inserting or combining graphic text and image features into the still photo. Video images can be seen via monitor as illustrated in reference number (21). FIG. 4 also has an example of on screen contrast adjustment (21a) to illustrate how various functions can be utilized on-screen as needed by the device user. The on-screen graphical adjusters can be used to adjust any feature or function on the digital frame camera.

Figure 5:
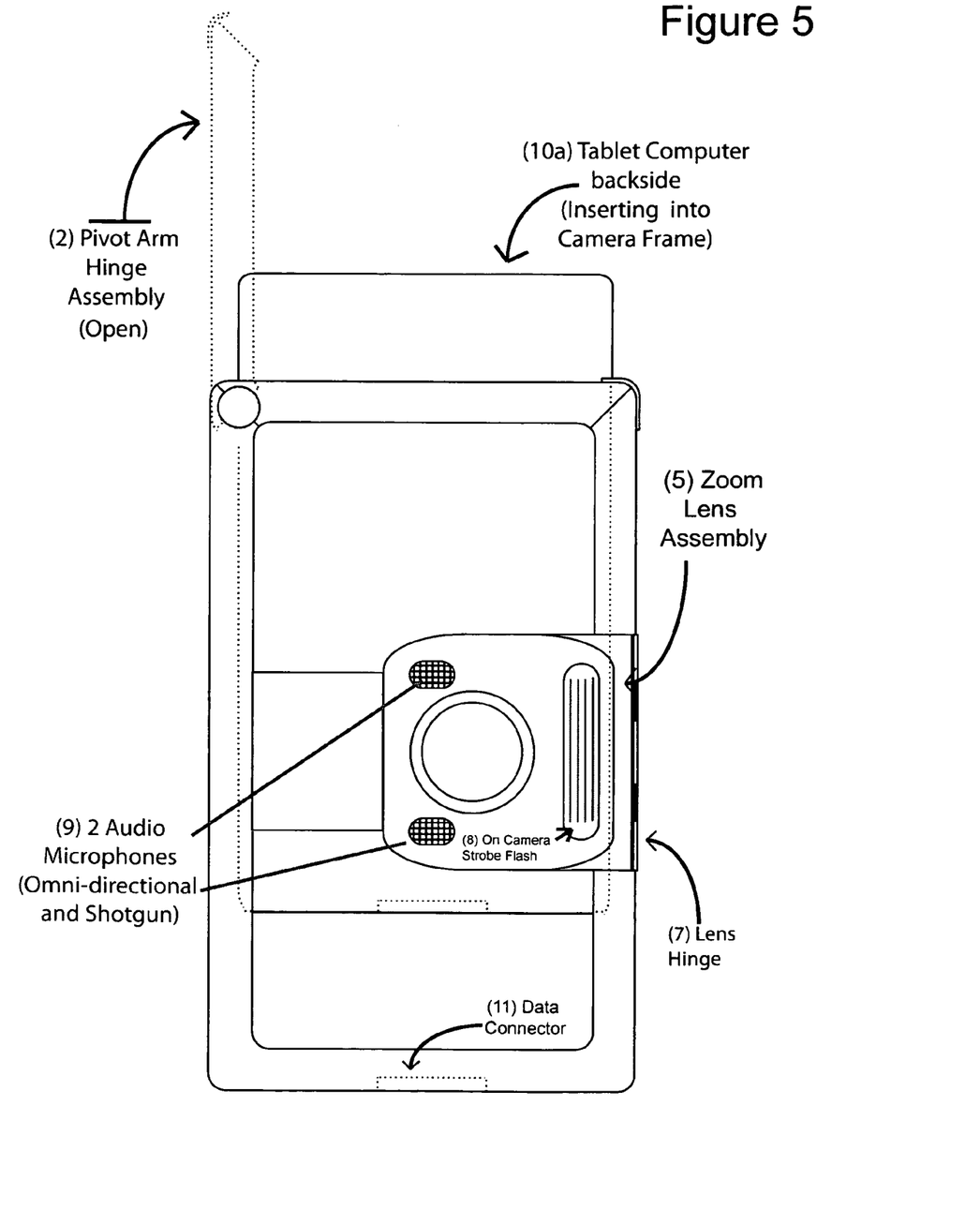
FIG. 5 shows an embodiment of the digital frame camera oriented in a vertical position.

FIG. 5 shows an embodiment of the digital frame camera oriented in a vertical position. The pivot arm hinge assembly (2) is swung open, which then allows the handheld device (24) to be slid into the digital frame camera. The pivot arm (2) is a good method for securely containing the handheld device in the digital frame camera housing. The method of FIG. 5 method of securing the handheld device in place using the swing arm can also be done with other methods such with one, two, or more clamps for securing the handheld device. In an embodiment, a U-shaped bar that has a long hinge the length of the bar may secure the handheld device to the digital frame camera. In another embodiment, rollers are mounted inside the frame that holds the handheld device in place.

Figure 6:
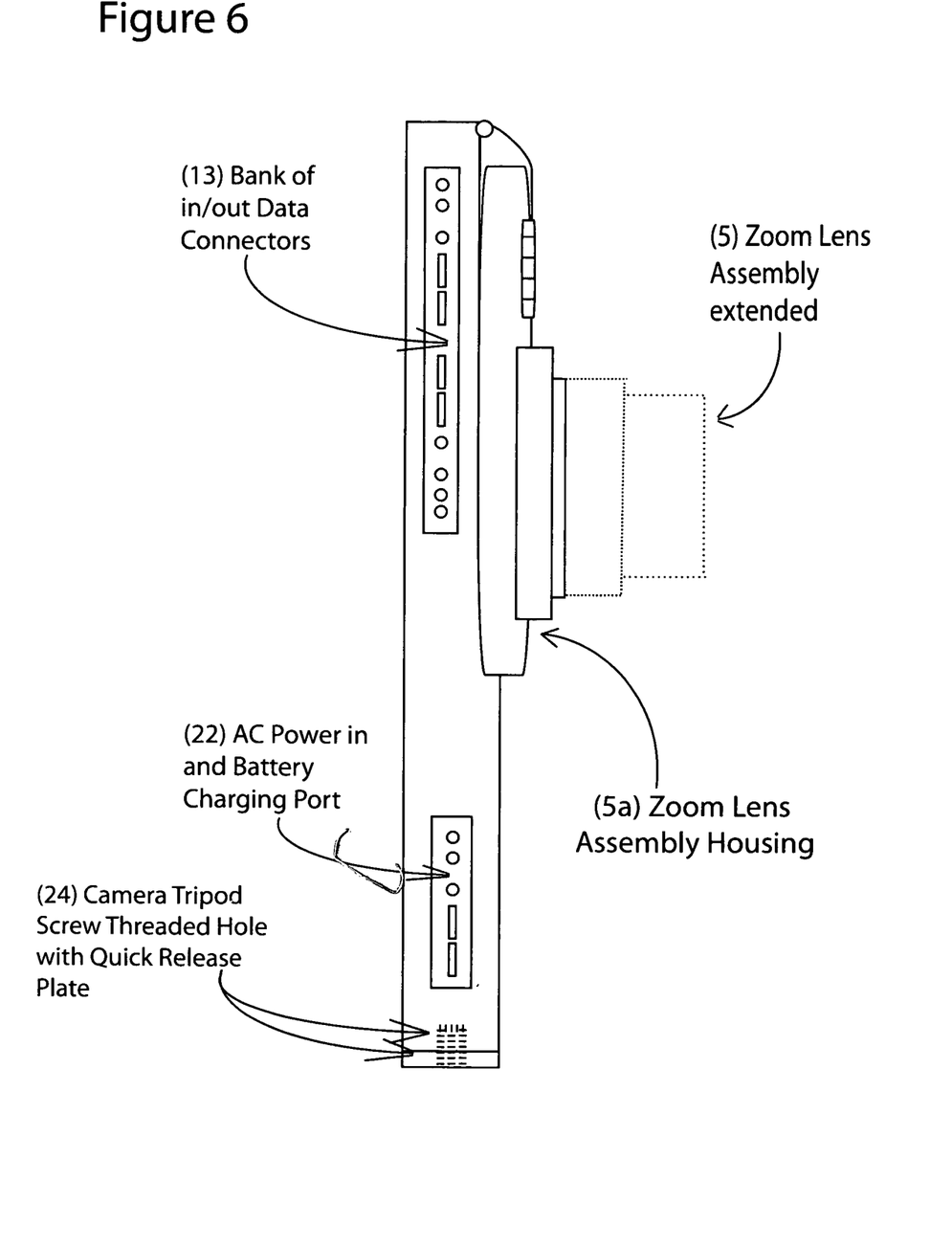
FIG. 6 shows a side view of an embodiment of the digital frame camera.

In an embodiment, handheld device (24) is slid completely into the digital frame camera until the handheld device connects with, and is seated in. the data connector (11). FIG. 5) illustrates how the digital frame camera and the handheld device (24) are coupled so as to function as one unit and so that, the digital frame camera and hand held device work together to create a new type of media capture and manipulation device. In an embodiment, the data connector (11) may transmit data back and forth from the digital frame camera to the tablet computer or smart phone. In addition, an embedded wireless data transmitter can send and receive information from the digital frame camera to the tablet computer or smart phone. The option of which method is utilized is based on user preference FIG. 6 shows a side view of the digital frame camera. The zoom lens assembly (5) is shown in an extended position, with a dotted outline to illustrate how the lens may zoom in and out. In an embodiment, the lens may zoom out to at least 80 mm or more and zoom in to at least a 30 mm lens setting. The lens may have multiple stages of lens cylinders, so that lens may zoom out and in to photograph images that are far away or close-up while the cylinders have the ability to compress into the zoom lens assembly housing (5a) so the lens has a high degree of mobility. The lens for the digital frame camera may be detachable and exchangeable with other lenses having other optical characteristics and features.

Also in FIG. 6 is a bank of in/out data connectors (13), which may give the device the ability to take in and send out numerous types of digital information such as digital sound, digital images files, digital video, and any other digital file that can work with the handheld devices operating system. The in/out connectors may be comprised of the most relevant types of technologies and therefore the bank of in/out data connectors (13) may have at least some or all of the connectors such as a USB, Firewire, MIDI, HDMI, mini-DVi, DMS-59, DA-15 (&15F), DE-9, Composite Video, VGA, RCA, mini (or stereo) headphone jack, TRS, S-Video, and any other audio, data, and video input/output connector, which may enhance the functionality and operation of the digital frame camera.

The Bank of in/out Data Connectors (13) also may have at least one slot for a data memory storage card(s) ready such as MiniSD, CF-1, MMC, xD, Smart Media, or Memory Sticks. In an embodiment, the bank of the connectors may also have a connector for a synchronization cord, and synchronization electronics for keeping a photo strobe light synchronized with the shutter and/or other processes associated with the taking of a picture (the synchronization electronics may also include a power pack).

In FIG. 6, the AC/DC power in and battery charging port (22) which can charge the internal batteries in the digital frame camera used for general device operations, such as power supply for microphones, the flash, zooms lens operations, and any other power needs of the digital frame camera. The charging and power supply system can charge both the batteries on the digital frame camera and the handheld device. The AC/DC Power in and Battery Charging Port (22) may also function as a direct AC power supply for the digital frame camera and the handheld device. Alternatively, the digital ram camera may draw power from the handheld device.

In the embodiment of FIG. 6 a tripod screw threaded hole and a quick release plate (24), which functions so that the digital frame camera can be mounted on a tripod or any other camera rigging device that would be appropriate for mounting the camera for efficient operation of the device. The quick release plate feature allows the camera to be removed and then remounted on the tripod and/or support rigging as the device users needs arise.

Figures 7, 7A:
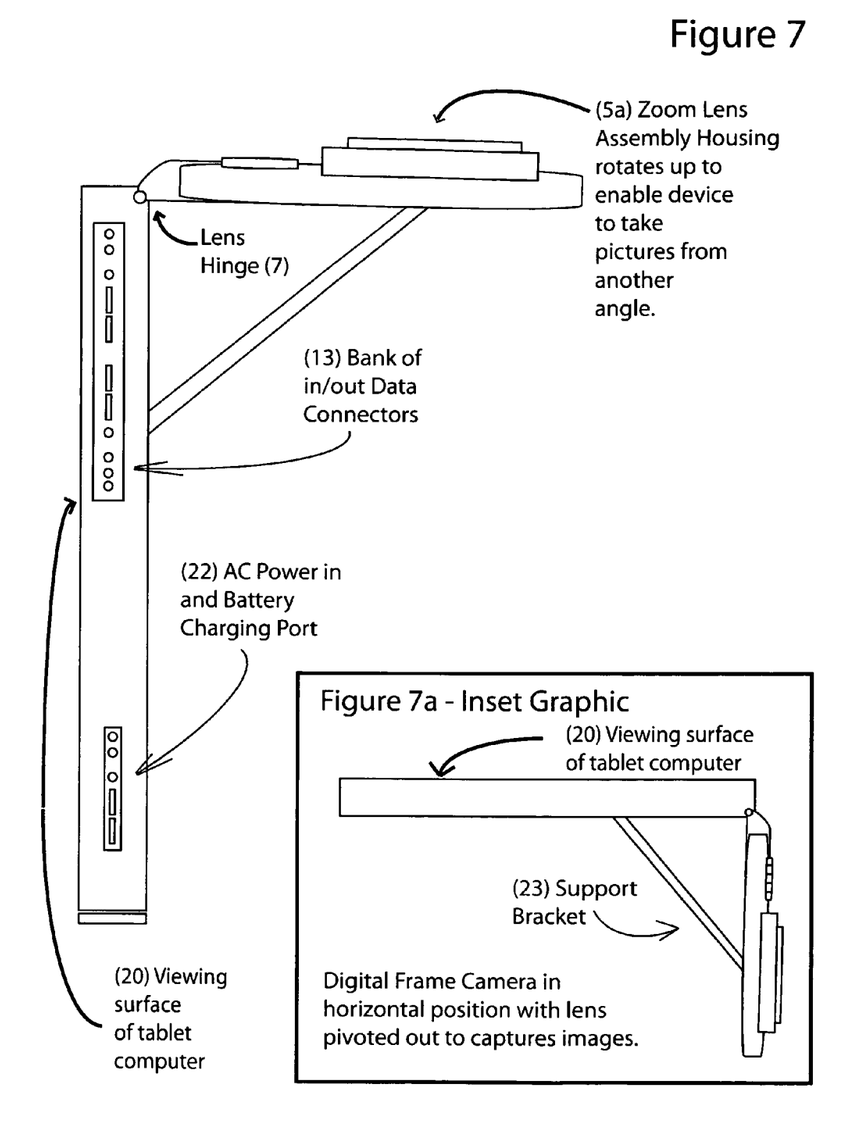
FIG. 7 show a side view of an embodiment of the digital frame camera with the zoom lens assembly housing.

FIG. 7 shows a side view of the digital frame camera with the zoom lens assembly housing (5a) swung out so that the camera user can take still pictures or record video with sound from another view angle. With the swung out orientation, the camera user may prefer to use the digital frame camera to shoot images from different angles. From the position shown in FIG. 6, when the zoom lens assembly (5a) is swung out, the zoom lens assembly is supported by the support brackets (23). In an embodiment there is only one support bracket. In another embodiment, there may be two or more support brackets. The support brackets (23) work in conjunction with the lens hinge (7), which enables the zooms lens assembly housing (5a) to swing out and provide stable support for the mechanism to function with no shaking or vibration. The bracket and hinge can be made of numerous types of metal, plastic, or whatever material may provide the best strength and stability while being efficient as a light weight material. The "swing out" version of the zoom lens assembly is an optional feature for user preference. In an embodiment, the digital frame camera smart phone version may have a zoom lens assembly that, is fixed and will not swing out. FIG. 7 also shows the lens support and computer (or electronic) circuitry board housings (6).

Figure 8:
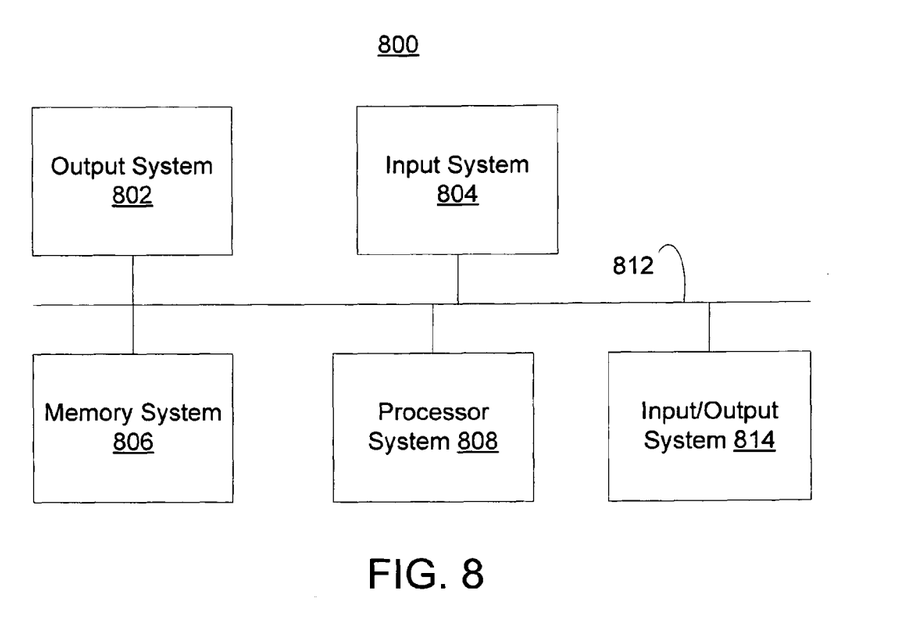
FIG. 8 shows a block diagram of a computing device, which may be the digital frame camera or the handheld device.

FIG. 8 shows a block diagram of a computing device 800, which may be the digital frame camera or the handheld device. The computing device may include output system 802, input system 804, memory system 806, processor system 808, communications system 812, and input/output device 814. In other embodiments, computing device 800 may include additional components and/or may not include all of the components listed above.

Computing device 800 is an example of a bock diagram of a circuit that may be the digital frame camera and/or the handheld device.

Output system 802 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. If computing device 800 is the handheld device, output system 802 may include a transmitter for receiving signals to a network, such as a mobile phone network, and for communicating with the digital frame camera. If computing device 800 is the digital frame camera, output system 802 may include wireless and/or wired connector for sending signals (e.g., image data and/or sound files) to the handheld device.

Input system 804 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. If computing device 800 is the handheld device, output system 802 may include a receiver for receiving signals from a network, such as a mobile phone network, and for communicating with the digital frame camera. If computing device 800 is the digital frame camera, output system 802 may include a receiver for receiving signals from the handheld device, such as control signals for controlling the taking of pictures or recording of sounds and/or the downloading of images and sounds.

Memory system 806 may include, for example, any one of, some of, any combination of, or all of a long term storage system, such as a hard drive; a short term storage system, such as random access memory; a removable storage system, such as a floppy drive or a removable drive; and/or flash memory. Memory system 806 may include one or more machine-readable mediums that may store a variety of different types of information. The term machine-readable medium is used to refer to any medium capable carrying information that is readable by a machine. One example of a machine-readable medium is a computer-readable medium. Any place a computer readable medium is mentioned, a machine readable medium may be substituted to get broader description of the invention. Whether computing device is the camera frame for the handheld device, memory 806 may store software for controlling the camera, using the monitor of the handheld device as a view finder for the camera, processing images and sound, and/or downloading the images and sound from the digital frame camera to the handheld device.

Processor system 808 may include any one of, some of, any combination of, or all of multiple parallel processors, a single processor, a system of processors having one or more central processors and/or one or more specialized processors dedicated to specific tasks. Also, processor system 808 may include one or more Digital Signal Processors (DSPs) in addition to or in place of one or more Central Processing Units (CPUs) and/or may have one or more digital signal processing programs that run on one or more CPU.

Communications system 812 communicatively links output system 802, input system 804, memory system 806, processor system 808, and/or input/output system 814 to each other. Communications system 812 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 814 may include devices that have the dual function as input and output devices. For example, input/output system 814 may include one or more touch sensitive screens, which display an image and therefore are an output device and accept input when the screens are pressed by a finger or stylus, for example. The touch sensitive screens may be sensitive to heat and/or pressure. The touch sensitive screen may be referred to as a touch screen. One or more of the input/output devices may be sensitive to a voltage or current produced by a stylus, for example. Input/output system 814 is optional, and may be used in addition to or in place of output system 802 and/or input device 804.

Figure 9A:
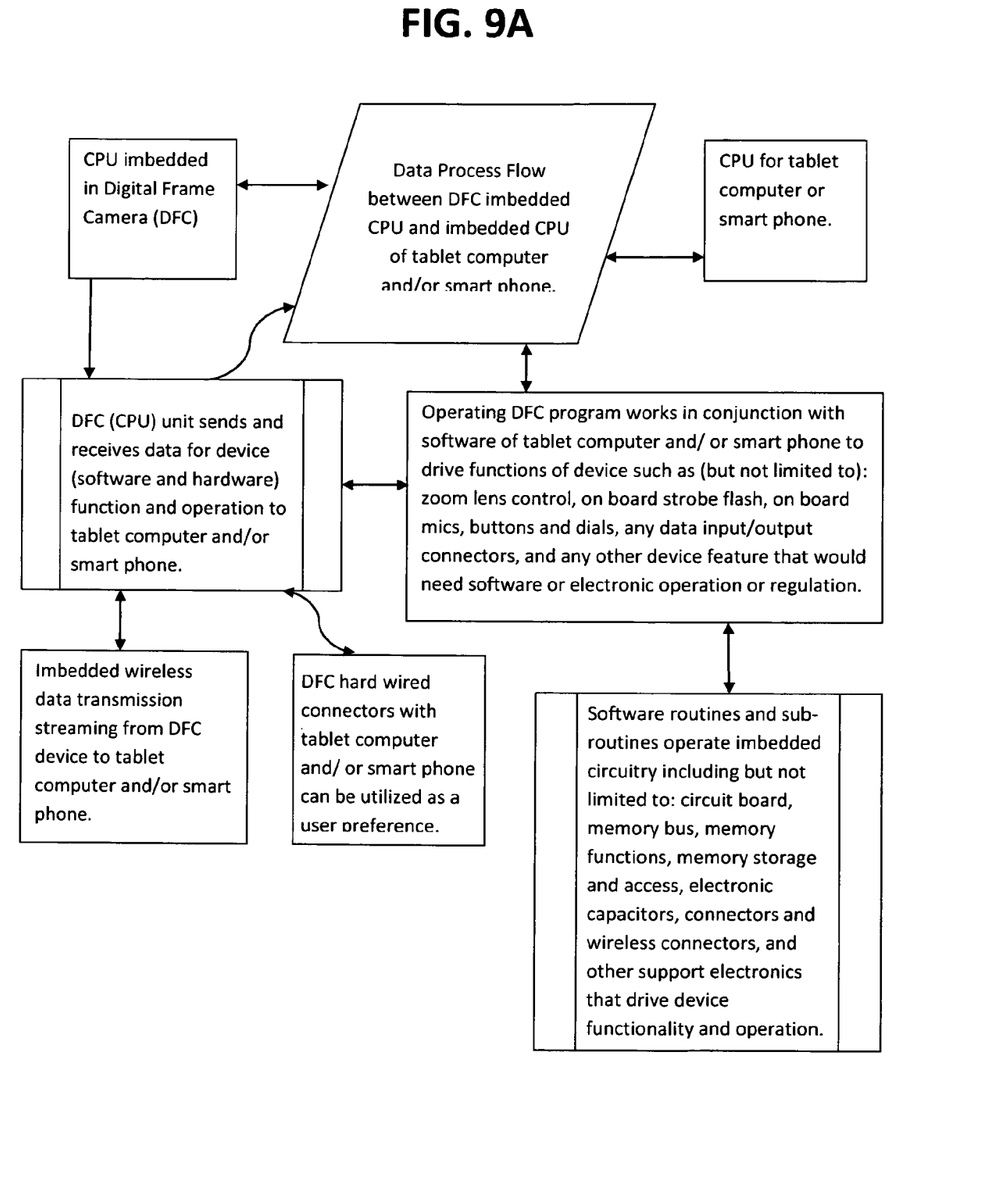
FIGS. 9A-C form a chart outlining the data and media process flow.
Figure 9B:
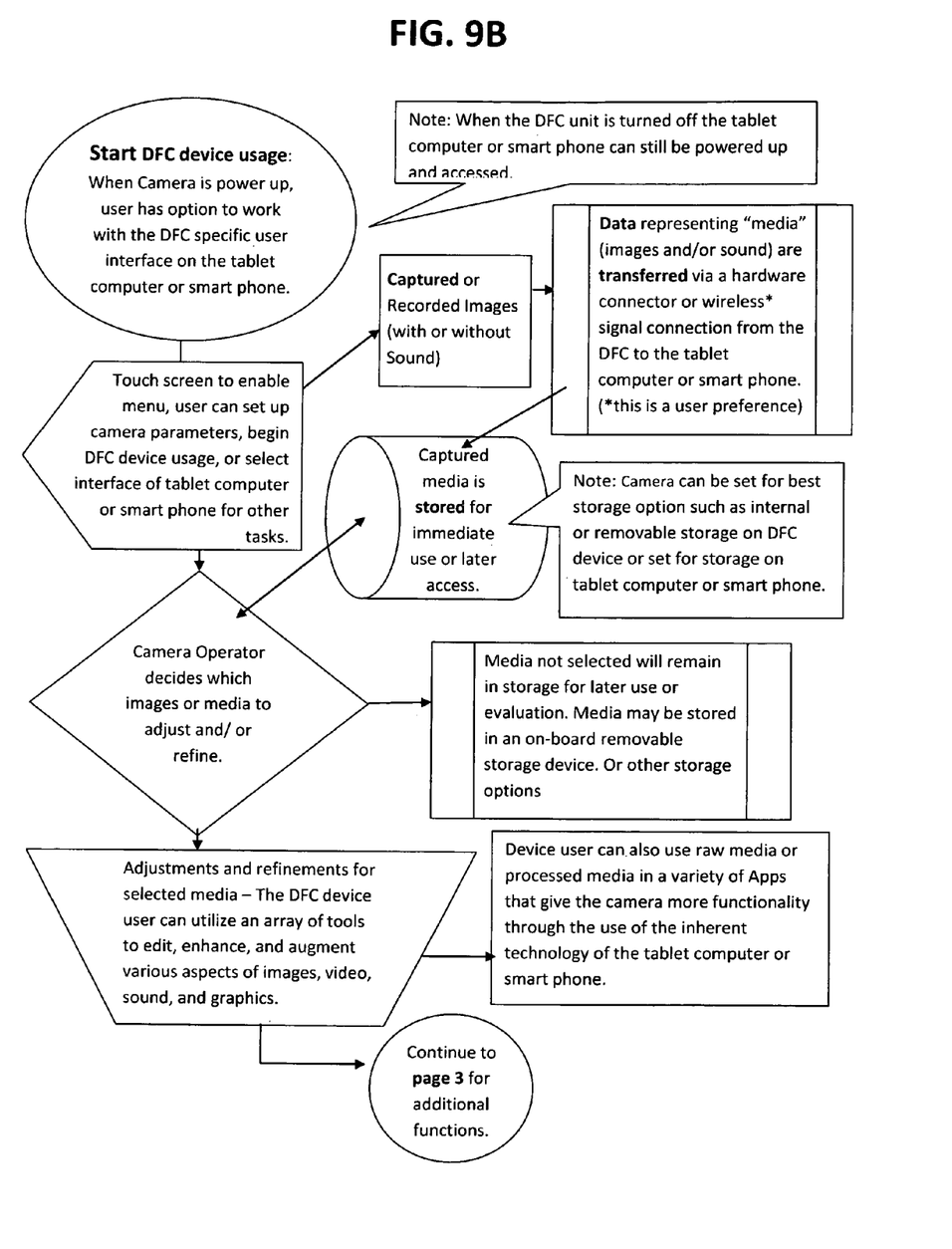
Figure 9C:
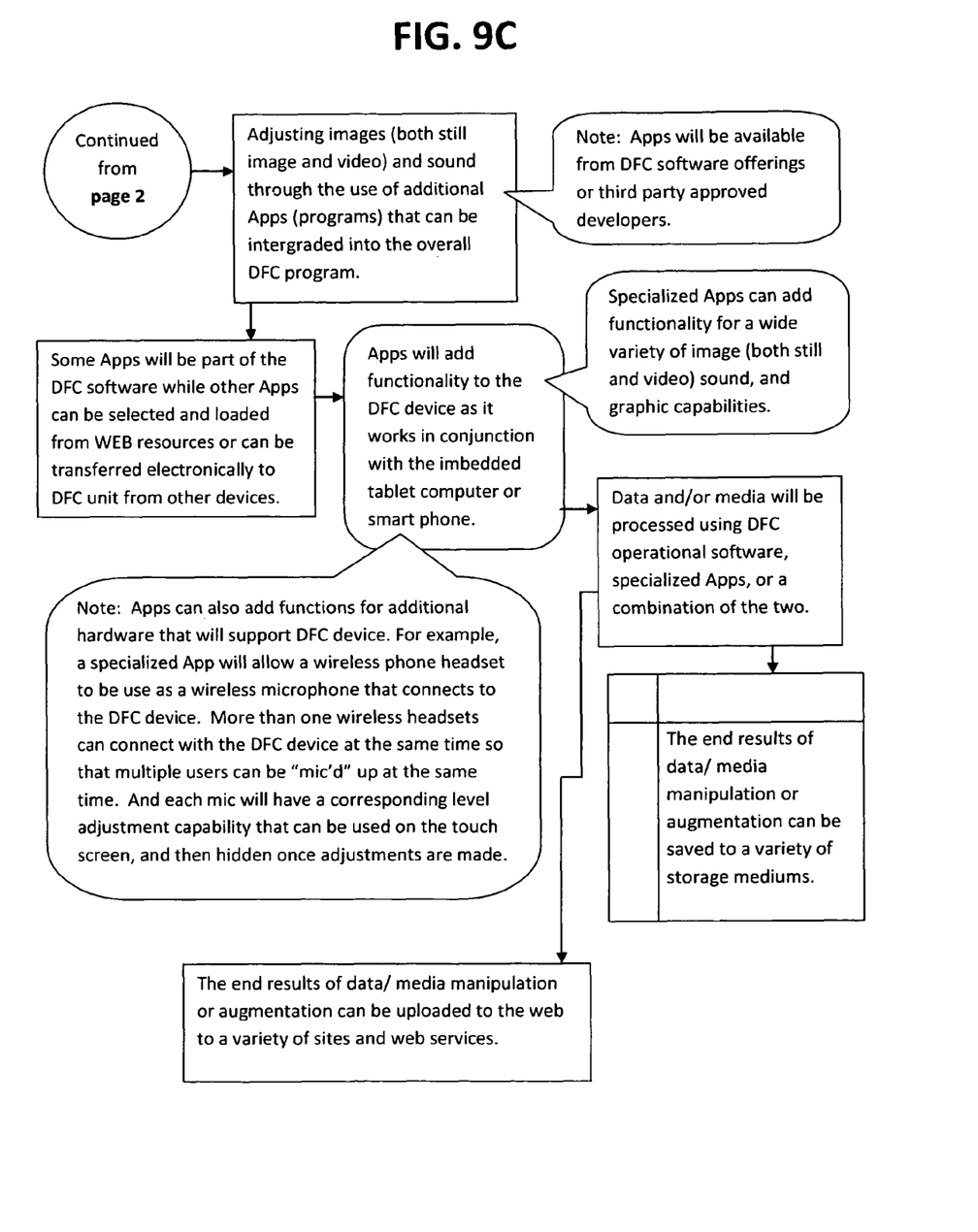

FIG. 9A-C are a chart outlining the data and media process flow.

In an embodiment, the digital frame camera may be used for capturing and recording digital images, photos, video, sound, and other media into a handheld device or smart phone by means of a rectangular digital frame camera device. The handheld device is slid into and coupled with by means of interconnecting the digital frame camera with the data port on the handheld device. It should be noted that the term digital frame camera refers to the device with and without the handheld device inserted into it.

In an embodiment, the handheld device functions like a still digital camera and/or a video camera with sound. In an embodiment, the digital frame camera, and/or software that comes with the digital frame camera, may be capable of immediate photo retouching, video, and/or sound editing, which may all be done on the handheld device platform.

In an embodiment, the digital frame camera may be used for taking digital still photograph pictures and storing the pictures on the handheld device's memory system or memory storage device for immediate or later use.

In an embodiment, the digital frame camera may be used for taking captured images and using software applications and or mini applications (apps) to manipulate the photo by means of selecting and adjusting certain features of the image, such as contrast, color, brightness, sharpness, and softness. Specialized software and apps may also add the ability of the handheld device user to add graphics features and or text graphics to the images.

In an embodiment, the digital frame camera may be used for specialized software and apps to render numerous visual effects on to images captured by the digital frame camera that may add a multitude of visual qualities and text rendering to these images while the image is captured or at a later time when the camera operator wishes to undertake the task of photo manipulation and post production adjustments. One example would be if the camera operator wished to have the photos taken with a blue (or any other color) filter, with the digital frame camera the operator can program a blue filter into the software of the handheld device and then capture blue filtered images as he/she are taking pictures. The camera lens does not need a blue filter attached to the lens, because the software may perform the filtering. The software may be used to achieve visual effects that change the quality of the video images (and sound). The software could act as a color or star filter, or add some visual effect that changes the appearance of the scene or subject being photographed and recorded.

In an embodiment, the digital frame camera may be used for selecting and cropping sections of an image as the image is being captured or manipulated at a later time in post production. The digital frame camera can crop, adjust, select, render, and/or perform other forms of image manipulation by means applications that are represented by on-screen icons that function as graphically adjustable tools and or actual physical buttons and dials that are situated on the digital frame camera.

In an embodiment, the digital frame camera may be used with pre-made graphical templates, which can be used as greeting cards, designer's page lay-outs, business cards, photo ID graphics, and any other commercial or personal graphic images where a photo can be digitally inserted into the graphics. The template would create an immediate graphic layout with photos taken that may be inserted directly into the template as the photo is taken with the digital frame camera or at a later time. The graphic and photo image compilation can be accompanied with sound that is a voice narration or ambient sound if needed. Numerous sound elements may be included, such as sound effects, music, and/or prerecorded sounds of any type.

In an embodiment, the using software or apps to edit and arrange images either captured with the digital frame camera or images from other sources, such as the web, the handheld device's hard drive, or flash memory. Once these images are arranged and manipulated with sound narration, sound effects and/or music can be added to the image arrangement so the sound may enhance the media presentation (such as a slide show) when played on the handheld device. The file generated by creating these images with sound can then be saved in memory and/or sent to other people, via the World Wide Web, or a portable memory device.

In an embodiment, the digital frame camera may be used for shooting video with sound with the digital frame camera. The recorded video media may be edited with various video editing tools and/or adjusted on the handheld device using specialized software and apps. The software and apps may allow the camera operator to put real time and/or post production effects onto the sound and video media captured by the digital frame camera. Video, sound, graphics, color, contrast, brightness, and numerous other visual and sound qualities and/or functions can be adjusted, manipulated, and/or edited in real time as it is recorded or in post production mode on the handheld device. In an embodiment, the digital frame camera may be used for adding real time images to existing photographs. Similarly, the digital camera frame enables the users to insert and add images to graphics as the photo is taken. The digital frame camera may be used to add photos and images to prepared photos on the handheld device. The digital camera frame can insert the photo taken into a scene or historic photo as a novelty (for example). In an embodiment, the digital frame camera may be used for adding real time images to existing video in addition to enabling the users to insert and add video (with sound) into graphics as the video is taken. In an embodiment, the digital frame camera can be used to add video and images to prepare video on the handheld device. The digital frame camera can insert the photo taken into a scene or historic video as a novelty (for example). On video may be prepared ahead of time and inserted into another video.

In an embodiment, the digital frame camera may be used for affixing detachable photographic lens (that can be exchanged for various focal length and or zoom lenses) to a rectangular frame device that houses a handheld device (which is referred to in this document as the digital frame camera).

EXTENSIONS AND ALTERNATIVES

The digital frame camera may come with software that is stored on a computer-readable media, such as a CD ROM, flash drive, a memory system of a server that is connected to a network, such as the Internet, and/or a memory within the digital frame camera, which may store various applications for processing the images and/or sound files after the taking the pictures and/or recording sounds and downloading the files to the handheld device. Alternatively or additionally, the software may be for operating the digital frame camera, via an user interface that runs on the handheld device.

Each embodiment disclosed herein may be used or otherwise combined with any of the other embodiments disclosed. Any element of any embodiment may be used in any embodiment.

Although the invention has been described with reference to specific embodiments, it may be understood by those skilled in the art that various changes may be made and equivalents may be substituted for elements thereof without departing from the true spirit and scope of the invention. In addition, modifications may be made without departing from the essential teachings of the invention.

The invention claimed is:

1. A camera for a handheld device comprising: a housing comprising a lens assembly, the lens assembly configured to acquire an image and image data corresponding to the image;
    one or more microphones configured to acquire sound signals and audio data corresponding to the sound signals;
    embedded electronics comprising non-volatile memory;
    a connector, electronically connected with the embedded electronics;
    a frame coupled with the lens assembly, the one or more microphones, the embedded electronics, and the connector, configured to selectively and slideably engage a handheld device, such that the connector and the handheld device are in electronic communication, thereby defining a frame assembly;
    a hinge connected with the frame and the housing, thereby hingedly connecting the frame and the housing;
    and, a support bracket connected with the frame and the housing, configured to stabilize the hingedly connected frame and housing;
    wherein the lens assembly is selectively rotationally positionable about the hinge;
    wherein the frame assembly is configured to secure and contain the handheld device;
    wherein the lens assembly is configured to provide a zoom range at least spanning 30 mm to 80 mm;
    wherein the embedded electronics are configured to store the image data and the audio data in the non-volatile memory, and, to selectively transmit the image data and the audio data via the connector; and,
    wherein the embedded electronics are configured to at least acquire the image data, acquire the audio data, and store the image data and the audio data in the non-volatile memory, absent the handheld device.

2. The system of claim 1:
    wherein at least one of the one or more microphones is a shotgun microphone;
    wherein the shotgun microphone is selectively rotationally positionable;
    wherein a first axis corresponds to on-axis sound acquisition utilizing the shotgun microphone;
    wherein an optical axis corresponds to image acquisition utilizing the lens assembly;
    and, wherein the shotgun microphone and lens assembly are configured as operable with the first axis essentially perpendicular to the optical axis.

3. The system of claim 1:
    wherein the handheld device comprises a memory system, and, the handheld device is configured to receive the image data and to store the image data in the memory system.

4. The system of claim 3:
    wherein the handheld device is configured to adjust features of the image by manipulating the image data.

5. The system of claim 4:
    wherein the handheld device is configured to add graphical features to the image, and to store the image data in the memory system.

6. The system of claim 4:
wherein adjusting features of the image comprises processing the image data with a color filter.

7. The system of claim 4:
wherein adjusting features of the image comprises cropping the image.

8. The system of claim 1:
wherein the handheld device is configured to insert the image data into a template for a document.

9. The system of claim 1:
wherein the frame is configured to selectively affix a detachable photographic lens.

10. The system of claim 1:
wherein the handheld device is at least one of a smart phone and a tablet computer.

11. A method comprising the steps of:

providing a housing comprising a lens assembly;

acquiring an image and image data corresponding to the image via the lens assembly;

providing one or more microphones;

acquiring sound signals and audio data corresponding to the sound signals via the one or more microphones;

providing embedded electronics comprising non-volatile memory;

providing a connector in electronic communication with the embedded electronics;

providing a frame assembly comprising a frame coupled with the lens assembly, the one or more microphones, the embedded electronics, and the connector;

selectively and slideably engaging a handheld device, such that the connector and the handheld device are in electronic communication;

securing and containing the handheld device with the frame assembly;

storing the image data and the audio data in the non-volatile memory, and, selectively transmitting the image data and the audio data via the connector;

providing a hinge connected with the frame and the housing, thereby hingedly connecting the frame and the housing; and, providing a support bracket connected with the frame and the housing, configured to stabilize the hingedly connected frame and housing;

wherein the lens assembly is selectively rotationally positionable about the hinge;

wherein the lens assembly is configured to provide a zoom range at least spanning 30 mm to 80 mm; and, wherein the embedded electronics are configured to at least acquire the image data, acquire the audio data, and store the image data and the audio data in the non-volatile memory, absent the handheld device.

* * * * *